United States Patent
Gang et al.

(10) Patent No.: US 11,363,316 B1
(45) Date of Patent: *Jun. 14, 2022

(54) CUSTOMIZED CONTENT STREAMING TECHNIQUES

(71) Applicant: Perfect Sense, Inc., Reston, VA (US)

(72) Inventors: David Gang, Oakton, VA (US); Bryan Morgan, Ramona, CA (US)

(73) Assignee: Perfect Sense, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/895,482

(22) Filed: Jun. 8, 2020

Related U.S. Application Data

(63) Continuation of application No. 15/703,437, filed on Sep. 13, 2017, now Pat. No. 10,681,395.

(51) Int. Cl.
| | |
|---|---|
| *H04N 7/10* | (2006.01) |
| *H04N 21/234* | (2011.01) |
| *H04N 21/81* | (2011.01) |
| *H04N 21/845* | (2011.01) |
| *H04N 21/258* | (2011.01) |

(52) U.S. Cl.
CPC . *H04N 21/23424* (2013.01); *H04N 21/25841* (2013.01); *H04N 21/812* (2013.01); *H04N 21/845* (2013.01)

(58) Field of Classification Search
CPC ............. H04N 21/435; H04N 21/2368; H04N 21/2187; H04N 21/472
USPC .......................................... 725/32, 105, 109
See application file for complete search history.

(56) References Cited

U.S. PATENT DOCUMENTS

| | | | |
|---|---|---|---|
| 2010/0251305 A1 | 9/2010 | Kimble et al. | |
| 2011/0264530 A1* | 10/2011 | Santangelo | H04L 65/4076 705/14.64 |
| 2016/0381110 A1* | 12/2016 | Barnett | H04L 65/601 709/231 |

* cited by examiner

*Primary Examiner* — Jivka A Rabovianski
(74) *Attorney, Agent, or Firm* — Fish & Richardson P.C.

(57) ABSTRACT

In some implementations, a system is capable of intelligently generating customized multimedia content streams that are distributed to different groups of users. The system generates the customized content streams such that the initial and terminating portions of the streams are shared between each of the content streams. The system adjusts the intermediate portions of the streams to, for example, the viewing preferences of each user group using alternate forms of content. In this regard, the customized content streams that have both customized portions and shared portions to provide a standardized yet adaptive viewing experience for all users.

18 Claims, 7 Drawing Sheets

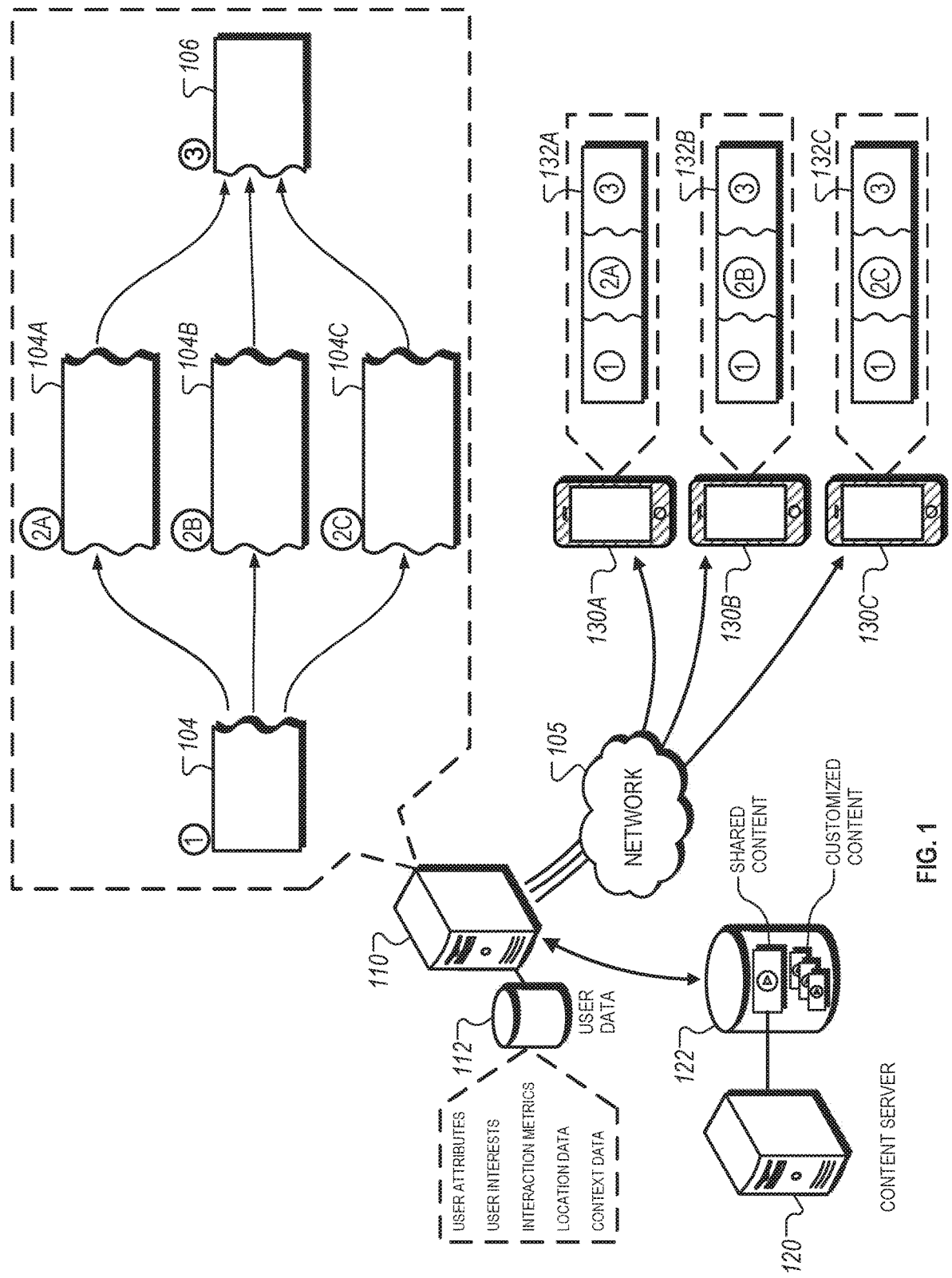

CUSTOMIZED CONTENT STREAMING TECHNIQUES

CROSS REFERENCE TO RELATED APPLICATIONS

This application is a continuation of U.S. application Ser. No. 15/703,437, filed Sep. 13, 2017, the contents of which are incorporated by reference herein.

BACKGROUND

Advances in mobile device and communications technologies have increased the number of avenues of user Internet access and media consumption. Users now interact with web content using applications running on a variety of different communication devices, e.g., smart phones, personal computers, personal digital assistants (PDAs), etc., and are doing so with increasing regularity.

SUMMARY

Multimedia provided to different users over a medium, such as broadcast media or network-based streams, are often standardized prior to transmission. For example, users that subscribe to live broadcasting services often receive the same multimedia broadcast, e.g., a single video footage captured of a sporting event. However, user viewing preferences for multimedia can often vary based on, for example, a location of a user, languages spoken by a user, and other factors. In this regard, different collections of users can often have different viewing preferences for a broadcast of the same event, or for multimedia of the same subject matter.

Traditional multimedia platforms often do not customize multimedia streams provided to different users due to a heavy burden imposed by additional steps necessary to generate alternative multimedia broadcasts. Moreover, content providers often require broadcasting entities to provide users the same broadcast to ensure that all users are provided a standardized or uniform viewing experience. However, because different user populations vary in their viewing preferences, providing standardized multimedia broadcasts to all users often results in some users receiving a suboptimal viewing experience, e.g., a viewing experience that includes content that is not relevant to a user's viewing preferences.

To address these and other limitations, a system is capable of intelligently generating customized multimedia streams that are distributed to different users or different groups of users. The system can generate the customized streams such that the initial and terminating portions of the streams are shared between each of the content streams to provide a somewhat uniform viewing experience. The system adjusts the intermediate portions of the streams to, for example, the viewing preferences of each user or each user group using different content segments that can represent alternate forms of the same subject matter. In this regard, the customized streams that have both customized portions and shared portions to provide a standardized viewing experience for all users in some respects, but an adaptive viewing experience for each user or user group in other respects.

The system is capable of using various video processing and stitching techniques to combine multimedia segments to generate customized streams. For example, the system can dynamically insert animations between segments and/or seamlessly stitch segments together to ensure that transitions between different portions of a customized content stream, e.g., between a shared portion and a customized portion, are not substantially perceivable by the user. In this manner, the system can insert customized streams into content provided through traditional content mediums, such as broadcasting media or network-based media.

The system can synchronize the portions within each of the customized streams so that shared portions begin and terminate at or near the same time within different customized streams. For example, customized segments that are unique to each customized stream can be inserted at the same (or substantially same) regions of a content stream such that shared portions of the customized streams are provided to users at substantially the same time or within a threshold time difference (e.g., within 15 seconds). As a result, when two distinct users view two different content streams, each user is shown a shared portion that is common to the two content streams, followed by unique intermediate portions that have substantially the same duration, and finally a shared portion that terminates at substantially the same time. This capability enables the system to, for example, insert customized streams within a predetermined programming schedule such as a television broadcasting schedule.

In some implementations, the system is capable using the techniques described herein to customize live broadcasting content. For example, the system provides live programming that has shared segments for two distinct users and individualized segments that are customized for each user. In this example, the live programming provided to each user can have the start and end times in each of the live programming sequences.

The architecture of the system provides various improvements in generating multimedia streams that are intelligently customized for different user populations. For instance, while many multimedia platforms use long-form multimedia to generate customized streams, the system described herein uses segmented multimedia that is combined as a sequence of short-form multimedia segments. For example, a one-hour broadcast can be segmented into fifteen-minutes segment. In this example, to generate multiple customized broadcasts, the system can vary the second and third fifteen-minutes segments while maintaining the first and segment fifteen-minute segments. In this regard, each of the customized broadcasts includes a shared portion, e.g., the first and fourth segments, and a customized portion, e.g., the second and third segments.

The system can also combine segments in an efficient manner to reduce the amount of processing necessary to generate the customized multimedia. For example, instead of a content provider having to generate multiple distinct long-form multimedia streams, the system can use a collection of classified multimedia segments to dynamically and automatically, e.g., without user input, generate customized multimedia streams. The segments can be combined according to a specified sequence so that each customized stream includes at least one portion that is shared among all of the customized streams.

In some implementations, a method includes the operations of: obtaining, by a server system, data indicating multimedia segments to be provided to computing devices. The computing devices includes a first computing device and a second computing device. The multimedia segments include (i) a first shared multimedia segment to be provided to each of the computing devices, (ii) alternative multimedia segments that are to be provided different subsets of the multiple computing devices, and (iii) a second shared multimedia segment to be provided to the computing devices.

The method also includes the operation of generating, by the server system, a first multimedia output for the first computing device. Generating the first multimedia output includes selecting a first subset of alternative multimedia segments from among the alternative multimedia segments, and combining the first shared multimedia segment, the first subset of alternative multimedia segments, and the second multimedia segment to generate the first multimedia output.

The method also includes generating, by the server system, a second multimedia output for the second computing device. Generating the second multimedia output includes selecting a second subset of alternative multimedia segment from among the alternative multimedia segments, and combining the first shared multimedia segment, the second subset of alternative multimedia segments, and the second shared multimedia segment to generate the second multimedia output, wherein the first subset of alternative multimedia segments is different from the second subset of alternative multimedia segments.

The method also includes transmitting, by the server system, the first multimedia output to the first computing device; and transmitting, by the server system, the second multimedia output to the second computing device.

One or more implementations can include the following optional features. In some implementations, the method includes the operation of obtaining, by the server system, account data for a first user associated with the first computing device and account data for a second user associated with the second computing device. In such implementations, the first subset of alternative multimedia segments is selected based on the account data of the first user, and the second subset of alternative multimedia segments is selected based on the account data of the second user.

In some implementations, the account data of the first and second users specify respective geographic locations of the first and second users, and the first and second subsets of alternative multimedia are selected based on the respective geographic locations of the first and second users.

In some implementations, the first shared multimedia segment, the second subset of alternative multimedia segments, and the second shared multimedia segment are combined according to a particular sequence for generating the first multimedia output, and the particular sequence specifies that: (i) the first shared multimedia segment precedes the second subset of alternative media segments within the first multimedia output, and (ii) the second subset of alternative media segments precedes the second shared multimedia segment within the first multimedia output.

In some implementations, the method includes the operations of: determining that a combined duration of the first subset of alternative multimedia segments is not equal to a combined duration of the second subset of alternative multimedia segments; and adjusting the first subset of alternative multimedia segments such that a combined duration of the adjusted first subset of the alternative multimedia segments is equal to the combined duration of the second subset of alternative multimedia segments.

In some implementations, the combined duration of the first subset of alternative multimedia segments is shorter than the combined duration of the second subset of alternative multimedia segments; and adjusting the first subset of alternative multimedia segments comprises inserting a particular video segment into the first subset of alternative multimedia segments, the particular video segment having a duration equal to the difference between the combined durations of the second subset of alternative multimedia segments and the first subset of alternative multimedia segments. In some implementations, the particular video segment includes an advertisement.

In some implementations, the combined duration of the first subset of alternative multimedia segments is shorter than the combined duration of the second subset of alternative multimedia segments. In such implementations, the method further includes the operations of: determining that difference between the combined durations of the second subset of alternative multimedia segments and the first subset of alternative multimedia segments is below a predetermined threshold; and adjusting the first subset of alternative multimedia segments comprises elongating one or more multimedia segments included within the first subset of alternative multimedia segments.

In some implementations, the combined duration of the first subset of alternative multimedia segments is shorter than the combined duration of the second subset of alternative multimedia segments. In such implementations, the method further includes the operations of: determining that difference between the combined durations of the second subset of alternative multimedia segments and the first subset of alternative multimedia segments is above a predetermined threshold; and adjusting the first subset of alternative multimedia segments comprises inserting one or more transitions between multimedia segments included within the first subset of alternative multimedia segments.

Other implementations of this and other aspects include corresponding methods, apparatus, and computer programs, configured to perform the actions of the systems, encoded on computer storage devices.

The details of one or more implementations are set forth in the accompanying drawings and the description below. Other features will be apparent from the description and drawings.

BRIEF DESCRIPTION OF THE DRAWINGS

FIG. 1 illustrates an example of a system that is capable of intelligently generating customized streams that are distributed to different users.

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 2A:
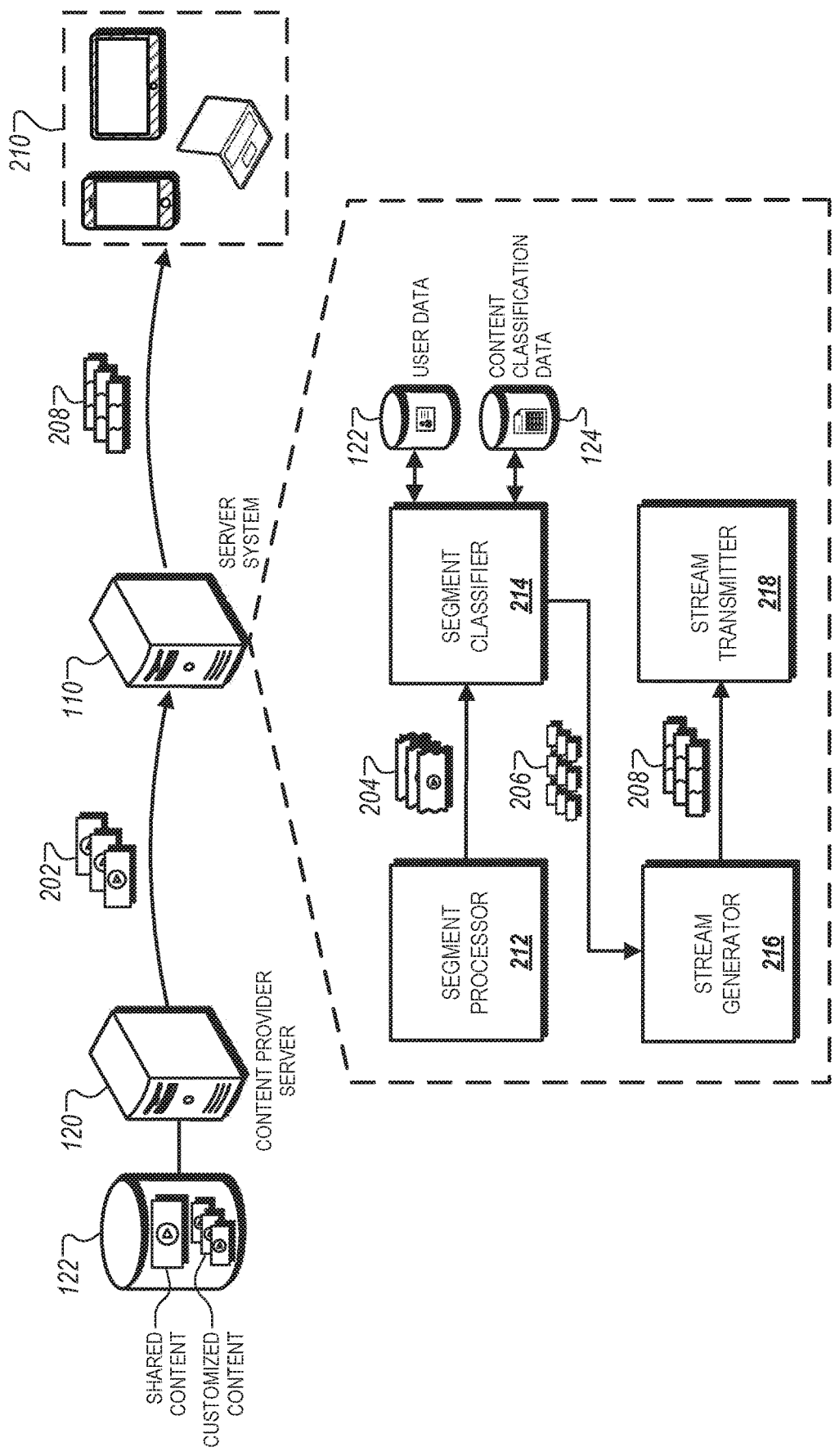
FIGS. 2A-B illustrate examples of techniques for generating customized streams from a collection of multimedia segments.

In general, this specification describes a system that is capable of intelligently generating customized multimedia streams that are distributed to different groups of users. The system generates the customized streams such that the initial and terminating portions of the streams are shared between each of the content streams. The system adjusts the intermediate portions of the streams to, for example, the viewing preferences of each user group using alternate forms of content. In this regard, the customized streams that have both customized portions and shared portions to provide a standardized yet adaptive viewing experience for all users.

As described throughout, a "content" refers to any form of digital multimedia. Content can include multimedia files that are accessed from computer-readable media, data that is streamed over a network medium, or data that is transmitting over a broadcasting medium. Examples of content described throughout this document can include textual content, audible content, e.g., music, and visual content, e.g., images or video. A user can access content using any suitable electronic device through any suitable means such as from a tangible medium, through a network medium, or a broadcasting medium. In some implementations, content is presented to a user through an application running on an electronic device.

As described throughout, "real-time" refers information or data that is collected and/or processed instantaneously with minimal delay after the occurrence of a specified event, condition, or trigger. For instance, "real-time data" refers to data, e.g., content association data, playback data, context data, etc., that is processed with minimal delay after a computing device collects or senses the data, e.g., using accelerometers, gyroscopes, magnetometers, etc. The minimal delay in collecting and processing the collected data is based on a sampling rate or monitoring frequency of the computing device, and a time delay associated with processing the collected data and transmitting the processed data over a network. As an example, a system may collect user interaction data in real-time as a user accesses customized streams. The user interaction data As an example, a computing device on which primary content is being accessed may collect data representing playback progression of the primary content every second and transmit the collected data to a server system as network data packets. The server system processes each received network data packet to monitor the progression of playback of the primary content to determine when computing devices access a designated frame of the primary content. In response to determining that the designated frame has been accessed, the server system transmits an instruction to the computing device to display a communication that includes secondary content items assigned to the designated frame. In this example, each of the processing operations can be performed in real-time to minimize the delay between a time point when the designated frame is accessed and a time point when the communication including the secondary content items are provided for output to the user.

FIG. 1 illustrates an example of a system 100 that is capable of intelligently generating 100 customized streams that are distributed to different users. In the example depicted, the system 100 includes a server system 110, a content server 120, and computing devices 130A, 130B, and 130C. The components of the system 100 exchange communications over a network 105. The server system 110 stores account data for users of the computing devices 130A-C within a repository 112. The content server 120 stores multimedia to be distributed to the computing devices 130A-C within a repository 122. As discussed below, the content to be distributed includes shared content segments, e.g., content provided to each of the computing devices 130A-C. The stored content also includes customized content segments, e.g., content provided to a subset of the computing devices 130A-C.

The server system 110 selects the customized segments to include in a customized stream based on user data stored within the repository 112. The user data can include, for example, user attributes, user interests, interaction metrics, a detection location, and/or other types of user activity data for a particular user collected by computing devices used by the particular user. In this regard, the user data can include data obtained from different data sources, e.g., a smartphone used by the user, a social network accessed by the user, or content distribution platforms that have user accounts for the user. The user data can be collected from these external sources can be based on obtaining a user's permission to grant the organization with access to such data. The content server 120 can obtain this data with the use of application package interfaces (APIs) that permit collection of data from such external data sources.

The server system 110 can use various techniques to select customized streams from among a collection of content streams to include within a customized stream to provide to a particular user or a particular collection of users. In some implementations, the server system 110 applies a rule-based personalization engine that applies customization rules to select customized streams to include within a customized stream. For example, the customization rules can include a rule assigns a set of customized segments to different user locations. In this example, the server system 110 determines a location within the user data and then applies the rule to select a corresponding set of customized assigned to the determined location. As another example, the customization rules can include a rule that assigns a set of customization segments based on user-specified preferences for content. In this example, content segments inserted within different customized streams can represent alternative forms of content that are adjusted and/or modified to a particular user-specified preference. For instance, a broadcast of a sporting event can be captured using different cameras placed in different areas of a stadium. Each customized stream can then include a different view of the sporting event, and the system selects the particular view to include within the customized stream based on the user's preference for a particular view.

In some implementations, the server system 110 applies learning techniques to select content segments to include in a customized segment provided to a particular user or a particular collection of users. For example, the server system 110 can provide the user data stored within the repository 112 as input to one or more statistical classifiers that are trained to classify users based on information contained within the user data, and then predict whether a certain piece of content that is likely to be viewed each classification. The statistical classifiers can be used to user different types of machine learning and data mining techniques to derive conclusions based on information included within the user data. As examples, the statistical classifiers can use supervised learning techniques, e.g., classification and/or regression based on recognized patterns within the user data, or clustering techniques, e.g., deriving conclusions about a collection of users. Other examples of techniques that can be applied include dimensionality reduction, structured prediction, anomaly detection, among others.

The server system 110 generates customized streams 132A-C by combining selected content segments according to a specified content sequence specified by a content provider. In the example depicted in FIG. 1, the content sequence specifies a shared initiating portion 104, followed by a customized intermediate portion including different customized segments 104A, 104B, and 104C, and a shared terminating region 106. The server system 100 can select each of the customized segments 104A-C from among the content repository 122 for insertion into a customized stream such as the customized streams 132A-C. In some implementations, such as the example depicted in FIG. 1, each portion includes a single content segment. In other implementations, each portion can include a combination of two or more content segments.

The computing devices 130A-C each receive a customized stream that includes a combination of shared content segments and customized content segments stored within the repository 122. For example, the computing device 130A is provided a customized stream 132A, the computing device 130B is provided a customized stream 132B, and the computing device 130C is provided to a customized stream 132C. As shown in FIG. 1, the customized streams 132A-C each share an initiating portion 104 and a terminating portion 106, but vary with respect to the intermediate portions.

Figure 3:
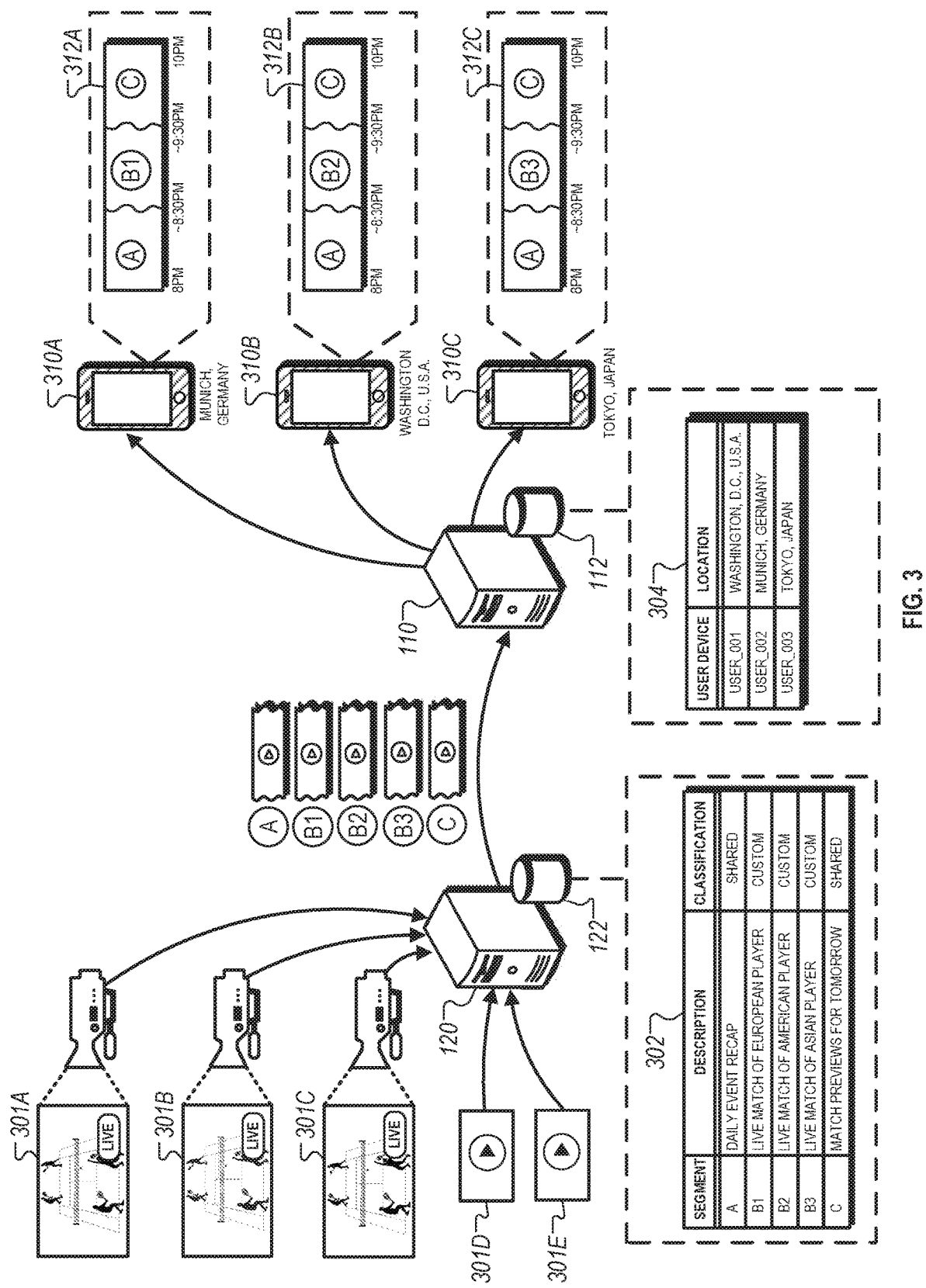
FIG. 3 illustrates an example of a technique for customizing a live broadcast production to provide customized live broadcast streams to different users.

The system 100 uses the customized stream structure depicted in FIG. 1 to for example, provide customized yet uniform viewing experience to different users (or populations of different types of users). The illustrated technique can be used for both live content, as depicted in FIG. 3, as well as recorded content. With respect to live content, the customized streams 132A-C can include intermediate portions that include different live feeds of the same event. For example, video footage of a live band concert can be collected by cameras placed in different locations of a concert hall with each camera focusing on a different musician of the band. In this example, the user data for a first user can indicate a known preference for the singer, whereas the user data for the second user can indicate a known preference for the drummer. The server system 110, in this example, provides a first customized stream with intermediate portions that have a greater portion of frames that include the singer for output to a computing device of the first user. In addition, the server system 110 provides a second customized stream with intermediate portions that have a greater portion of frames that include the drummer for output to a computing device of the second user.

With respect to recorded content, the customized streams 132A-C can include intermediate portions that relate to the subject matter but vary with respect to how the subject matter is presented to a user. For example, a documentary for chocolate can be constructed from multiple content segments that provide information about different global chocolate products. The server system 110, in this example, can use a user's location to generate customized streams that include different intermediate portions focusing on a different set of chocolate products. In this example, a first user that is located in the United States receives a first customized stream including intermediate portions that provide information about American chocolate products. In addition, a second user that is located in Brazil receives a second customized stream with intermediate portions that provide information about South American chocolate products.

In some implementations, the server system 110 is capable of selecting customized segments based on two or more different types of user attributes to, for example, provide user-specific content streams to different users located in the same geographic. In such implementations, the server system 110 is capable of performing content selection to provide customized content to users in a more granular fashion. For example, user data stored within the repository 112 can include both location data as well as historical activity data identifying areas within a geographic location that the user has previously visited. In this example, if the server system 110 determines that the user has been to a particular restaurant within a geographic location, then a customized content stream provided to the user can include customized segments that are associated with the particular restaurant.

Additionally, a user that is located within the same geographic region but has not previously visited the particular restaurant would receive a customized content stream with different customized segments that are not associated with the particular restaurant. This example illustrates that the techniques described herein can be used to provide, for example, a higher-level of customization relative to traditional cablecast or broadcasting techniques, which often present location-specific advertisements to a collection of users that are located within a certain geographic location.

Figure 2B:
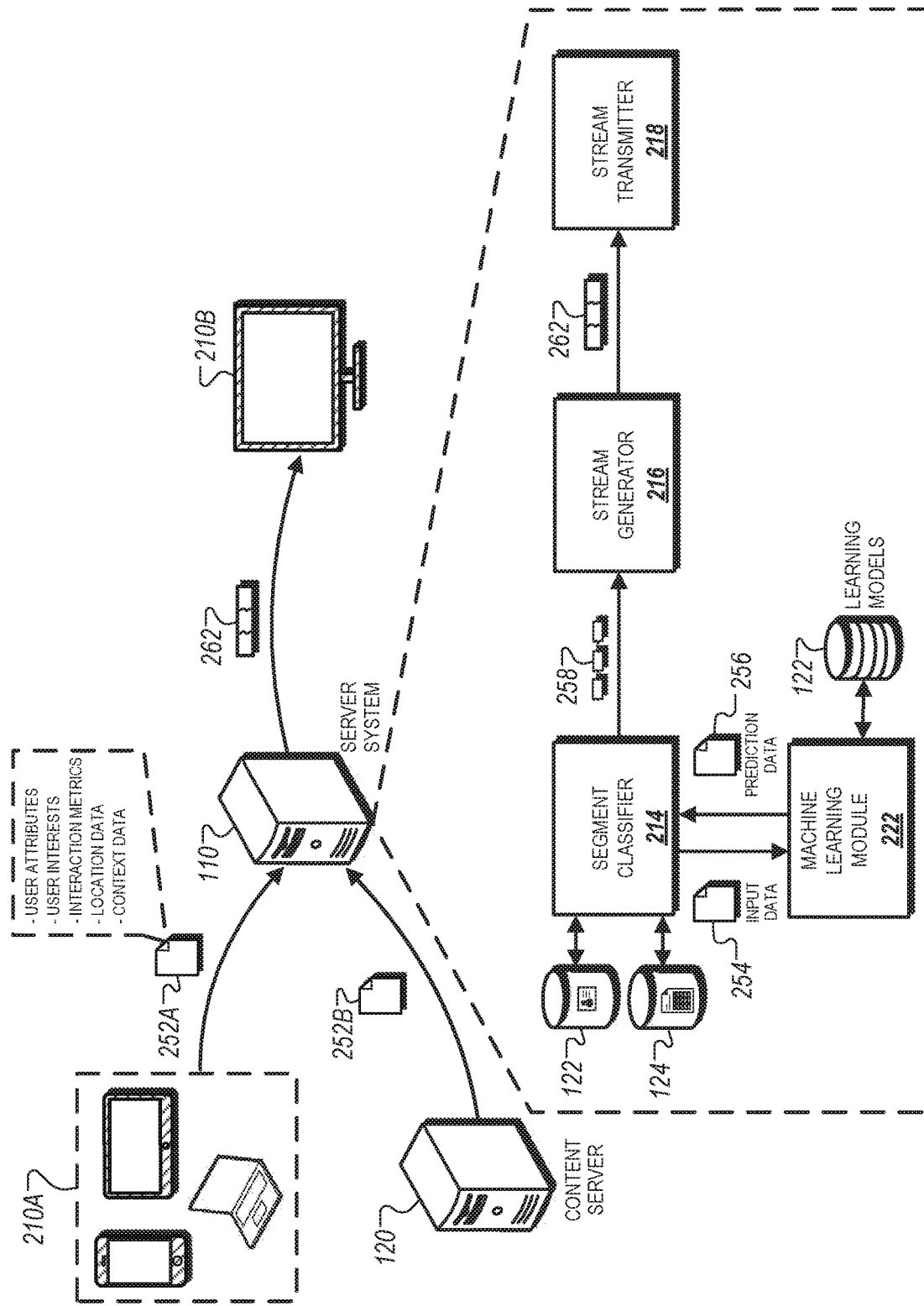

FIGS. 2A-B illustrate examples of techniques for generating customized streams from a collection of multimedia segments. Referring initially to FIG. 2A, an example of a technique for generating customized streams 208 from different users from a collection of content segments 202 is depicted. In the example depicted, the server system 110 initially obtains the content segments 202 from the content server 120. The server system 110 includes components such as hardware and software modules to process and combine the content segments 202 to generate the customized streams 208. For example, the server system 110 can include a segment processor 212, a segment classifier 214, a stream generator 216, and a stream transmitter 218. The segment processor 212 processes the content segments 202 to generate processed content segments 204. The processing techniques used can be based on the type of multimedia included within the content segments 202. For example, the segment processor 212 can performing an audio processing technique, e.g., standardizing a volume magnitude of content segments, if the content segments represent audio files. In another example, the segment processor 212 can perform a visual processing technique, e.g., performing color correction for video or images, if the content segments represent video files.

The segment processor 212 can perform other types of steps to standardize each of the content segments 202 according to a set of requirements specified by a content provider. For example, the segment processor 212 can include subtitles for video files, inserting branding items or watermarks, adjust the video quality, convert multimedia files to a certain file type, among others. In some implementations, the segment processor 212 performs operations to standardize the content segments 202 irrespective of content provider requirements, e.g., adjusting the color levels of video files according to uniform color scheme.

The segment classifier 214 classifies each segment within the processed contents 204 based on user data and content classification data stored within repositories 122 and 124, respectively. The user data 122 can specify user attributes, user interests, interaction metrics, user locations, and/or user activity data as discussed about with respect to FIG. 1. The content classification data 124 specifies one or more content attributes that are used to categorize and/or organize the processed content segments 204. For example, the content classification data 124 can include metadata for content that includes the content segments 204, or other associated data such as user reviews submitted online, associated keywords, topics associated with the subject matter included within the content, among others. In some implementations, the content classification data 124 includes a combination of manually submitted information, e.g., classifications provided by a content editor, and automatically generated information, e.g., classifications determined by the segment classifier 214 based on applying a statistical classifier. The segment classifier 214 can perform classification based on a set of manual classifications provided by a content editor associated with the content provider, or automated classification without receiving any user input. With respect to automated classification, the segment classifier 214 can be configured to perform a rule-based classification based on customization rules provided by a content provider, or alternatively, using statistical classification techniques that utilize machine learning models. Classification based on machine learning models is discussed in more detail with respect to FIG. 2B.

The segment classifier 214 applies the classifications to determine content sequence data 206. The content sequence data 206 specifies a particular sequence according to which individual sequence segments should be combined in order to generate a customized stream. For example, the segment classifier 214 can use the classification techniques to initially identify content segments that are shared content segments and content segments that are customized content segments. In this example, the segment classifier 214 then determines an appropriate stream sequence based on, for instance, rules specified by the content provider. As an example, the content provider may specify that all customized streams include a first content segment at the beginning of each stream and a second content segment at the end of each stream. In this example, the segment classifier 214 determines multiple stream sequences that all vary with respect to the order of segments included within the intermediate regions but all specify the first and second content segments as the first and last segments, respectively.

The stream generator 216 combines individual content segments according to the content sequence data 206 to generate customized streams 208. The stream generator 216 can use any suitable combination technique based on the type of multimedia that is being combined. For example, the stream generator 216 may use an audio fade-out and fade-in transition to join two audio segments. As another example, the stream generator 216 may apply a video stitching technique that inserts a transition between two frames of different video files. In some implementations, the stream generator 216 can insert certain effects to ensure that a customized stream, when combined, provides a seamless transition between individual segments that minimizes the disruption to a use's viewing or listening experience. For example, the stream generator 216 may insert a visual transition animation between the last frame of a preceding video segment and the first frame of a following segment to prevent a drastic change between the video segments.

The stream transmitter 218 outputs the customized streams 208 to the computing devices 210. The stream transmitter 218 uses a transmission technique that provides each computing device with a particular customized stream from among the customized streams 208 that is assigned to a particular computing device. In some implementations, the stream transmitter 218 obtains a transmission list that identifies, for example, network addresses for each computing device, e.g., a public internet protocol (IP) address, and a customized stream assigned to each the network address. In another example, the transmission list can include hardware identifiers for a signal receiving device associated with a user, e.g., a receiver number of a set-top box through which the user accesses the customized content. In some other examples, the transmission list can include a device identifier that is uniquely assigned to a device used by a user to access the customized content stream. The stream transmitter 218 provides customized streams 208 to the computing devices 210 such that each device receives a content stream that is uniquely customized for a user based on various factors discussed above with respect to FIG. 1.

Referring now to FIG. 2B, an example of a technique for generating a customized segment 262 for a single user is depicted. In the example depicted, the server system 110 personalizes a content stream based on user data 252A and according to rules identified within editorial data 252B, and provides the customized segment 262 for output to a computing device 210B of the user. In this example, the server system 110 includes the segment classifier 214, the stream generator 216, the stream transmitter 218, and additionally, a machine learning module 222. In some implementations, the techniques described with respect to FIG. 2A is combined with the techniques described with respect to FIG. 2B. For example, in such implementations, the server system 110 is capable of using the stream generation techniques depicted in FIG. 2A and stream personalization techniques depicted in FIG. 2B.

The server system 110 initially obtains user data 252A from computing devices 210A. The computing devices 210A can include various devices that are associated with a user. As shown, the computing devices 210A includes a smartphone, a tablet computing device, and a notebook computing device of a user. The computing devices 210A collect user data 252A that identifies, for example, user attributes, user interests, interaction metrics, location data, and/or context data of a user. The server system 110 processes the user data 252A in a similar manner as the user data 112 discussed above with respect to FIG. 1. Although FIG. 2B illustrates the computing devices 210A and 210B as being separate for simplicity, in some implementations, the user data 252A additionally includes data collected by the computing device 210B.

The server system 110 obtains editorial data 252B from the content server 120. The editorial data 252B can include rules specified by an editor of the content provider for generating customized streams. For example, the editor can specify restrictions on the type of content to be combined, branding requirements for including promotional content, or formatting and/or visual criteria for the customized streams. In some instances, the editorial data 252B includes one or more triggers, conditions, and actions to automate the content segment selection and/or classification techniques described herein. For example, a trigger or condition can specify a particular type of indication within the user data 252A, e.g., a user preference for a particular type of content. In this example, the system action specified by the rule can be the selection of content segments classified as the particular type of content and to be included within a customized stream to be provided to the user.

The segment classifier 214, the stream generator 216, and the stream generator 218 operate in a similar manner as discussed above with respect to FIG. 2A. For instance, the segment classifier 214 generates content sequence data 258 based on classifying a set of content segments and determining a proper sequence for combining content segments. The stream generator 216 combines individual content segments according to the content sequence data 258 to generate a customized stream 262. The stream transmitter 218 provides the customized stream 262 for output to computing device 210B. In the example depicted in FIG. 2B, the computing device 210B represents a display device, e.g., a television, on which the user views the customized content 218.

In the example depicted in FIG. 2B, the segment classifier 214 also applies learning techniques in association with a machine learning module 222. The machine learning module 222 performs various statistical classification techniques on input data 254 received by the server system 110, e.g., the user data 252A and the editorial data 252B, using learning models 122. The machine learning module 222 can be, for example, any type of software that is trained using training data to make statistical inferences based on recognizing patterns within the input data 254.

The learning models 122 can represent machine learning models that have the make predictions on input data based on using, for example, pattern recognition and computational learning. For example, the learning models 122 can be programmed to apply statistical techniques, e.g., regression and/or classification, to predict and/or make inferences given a set of input data. As an example, the learning models 122 can be applied by the machine learning module 222 to predict that a user has a certain set of viewing preferences based on, for instance, a list of content previously accessed by the viewer, viewing patterns while accessing the list of content, and/or other information associated with the list of content. As another example, the learning models 122 can be applied by the module 222 to classify a user as being included within a particular group of users that includes other users that are determined to have similar user data. In this example, a user can be classified as being included in the particular group of users based on a combination of factors that are not immediately apparent, e.g., based on performing similar actions while accessing the same content. In this regard, the machine learning module 122 may apply the learning models 122 to categorize and group users according to more granular information that combines various user attributes such as, for example, the location of the user, demographic information for the user, viewing history of the user, etc.

The machine learning module 222 applies learning techniques to select content segments to include in a customized segment provided to a particular user or a particular collection of users. For example, the machine learning module 222 can provide the user data stored within the repository 112 as input to one or more statistical classifiers that are trained to classify users based on information contained within the user data, and then predict whether a certain piece of content that is likely to be viewed each classification. The statistical classifiers can be used to user different types of machine learning and data mining techniques to derive conclusions based on information included within the user data. As examples, the statistical classifiers can use supervised learning techniques, e.g., classification and/or regression based on recognized patterns within the user data, or clustering techniques, e.g., deriving conclusions about a collection of users. Other examples of techniques that can be applied include dimensionality reduction, structured prediction, anomaly detection, among others.

The stream transmitter 218 provides the customized stream 262 for output to computing device 210B. In the example depicted in FIG. 2B, the computing device 210B represents a display device, e.g., a television, on which the user views the customized content 218.

FIG. 3 illustrates an example of a technique for customizing a live broadcast production to provide customized live broadcast streams to different users. In the example depicted, the live broadcast production relates to an international sporting tournament such as the United States Tennis Open Championships. In this example, broadcasts of a multi-day tournament are provided to users that are located in different geographic locations. Broadcasts include a combination of live coverage, e.g., a live broadcast of an ongoing tennis match, and coverage recaps, e.g., a broadcast that includes summary statistics of completed tennis matches.

In the example depicted in FIG. 3, broadcasts programming provided to all users is organized and distributed according to a broadcast schedule that specifies time slots for content to be provided to users. The broadcast schedule depicted in FIG. 3 is a block programming schedule for simplicity, but any other suitable scheduling strategy can also be employed. Other types of schedules that can also be used include bridging, cross-programming, counter-programming, dayparting, stacking, among others. The content server 120 can be managed by a broadcasting organization that is authorized by a sporting association such as the United States Tennis Association (USTA) to provide broadcast coverage over a suitable medium. In some instances, the content server 120 can be managed by a content distributor that purchases a license to access, modify, and/or distribute broadcast data, e.g., video data, collected by the broadcasting organization.

Referring now to the technique depicted in FIG. 3, the content server 120 initially obtains content data for a broadcast to be provided to computing devices 310A-C. The obtained content data includes live streams 301A, 301B, and 301C captured by video cameras of the broadcasting organization. Each stream represents video footage collected in real-time of a different tennis match being played live. In the example depicted in FIG. 3, the live stream 301A includes video footage of a tennis match including a European player, the live stream 301B includes video footage of a tennis match including an American player, and the live stream 301C includes video footage of a tennis match including an Asian player.

The content data obtained by the content server 120 also includes video data 301D and 301E, which are pre-recorded video footage generated by a content provider and to be included in a live broadcast. For example, the video data 301D can include a recap of the results of tennis matches played in the previous week, and the video data 301E can include a summary of scheduled matches for the following day and/or the most recent tournament standings at the time of broadcast. In other examples, the content server 120 can obtain other types of pre-recorded video, such as promotional content for products and services associated with the content provider and/or the broadcasting organization, e.g., promotional content for sports memorabilia associated with athletes participating in the tournament, advertisements for upcoming tennis matches, or content provided by sponsors of the tennis match.

In the example depicted in FIG. 3, the pre-recorded video clips within obtained content data as obtained as a set of short-form videos, e.g., video clips with a duration less than thirty minutes. In some implementations, the content data obtained by the content server instead includes long-form video that is generated using traditional broadcasting techniques. For example, the video data 301D and 301E include video for an entire program segment instead of video clips to be included within a live broadcast. In such implementations, either the content server 120 or the server system 110 may process the video data 301D and 301E to generate segmented video clips.

The content server 120 processes the obtained content data and generates a set of content segments to be stored within the content repository 122. For example, the content server 120 generates content segments B1, B2, B3 for live streams 301A, 301B, 301C, respectively, and content segments A and C for video data 301D and 301E, respectively. In this example, the content server 120 assigns a time duration for each segment based on, for example, editorial rules provided by a content editor. For instance, the editorial rules can specify 30-minute long durations for initiating and terminating portions to be shared by each customized broadcast stream, and an hour-long duration for an intermediate portion specified to each customized broadcast stream. In this example, although the live streams 301A-C are collected on an ongoing basis, the content segments corresponding to the live streams, e.g., segments B1-B3, are broadcasted to the computing devices 310A-C for the duration specified by the editorial rules.

The content server 120 stores the content segments A, B1-B3, and C in a collection of content stored within the repository 122 in manner similar to the technique discussed above with respect to FIG. 1. The repository 122 includes a content classification table 302, which identifies the content segments, and for each content segment, a description of the content segment, and an associated classification. The information specified within the repository 122 can be manually provided by a content publisher, or alternatively, automatically determined using learning and/or classification techniques such as those discussed above with respect to FIG. 2B. For example, the content server 120 can use a combination of object recognition, object classification, and/or video processing techniques.

In the example depicted in FIG. 3, the content classification table specifies two types of content classification, e.g., "SHARED" and "CUSTOM." In this example, "SHARED" content segments represent content to be included in each live broadcast, and "CUSTOM" content segments represent content to be include a live broadcast provided only to a particular user or a particular collection of users.

The server system 110 obtains the content segments A, B1-B3, and C generated by the content server 120. The server system 110 also obtains user data stored within the repository 112. In the example depicted in FIG. 3, the user data includes a location table 304 that identifies a detected location for each of the computing devices 310A-C. In this example, the location of each computing device is used to determine the appropriate customized live broadcast stream to provide for output. For example, as discussed above with respect to FIG. 2, the server system 110 selects a set of individual segments from among the content segments A, B1, B2, B3, and C, and combines the selected segments according to a specified segment sequence.

The computing devices 310A-C each receive a customized live broadcast during a two-hour time block between 8 PM and 10 PM. As shown, each of customized live broadcasts 312A, 312B, and 312C share an initiating portion that corresponds to content segment A, which presents a daily event recap of the entire tournament, and a terminating portion that corresponds to segment C, which presents match previews for all contents for the following day.

However, the live broadcasts 312A-C vary with respect to intermediate portions between roughly 8:30 PM to 9:30 PM, which includes different parallel live broadcasts based on the location of the computing device. For example, the customized stream 312A provided to the computing device 310A includes an intermediate portion that corresponds to content segment B1, which presents a video feed of a live match of European tennis players. Alternatively, the customized stream 312B provided to the computing device 310B includes an intermediate portion that corresponds to content segment B2, which presents a video feed of a live match that includes an American tennis player. In the other example, the customized stream 312C provided to the computing device 310C includes an intermediate portion that corresponds to content segment B3, which presents a video feed of a live match includes an Asian tennis player.

Figure 4:
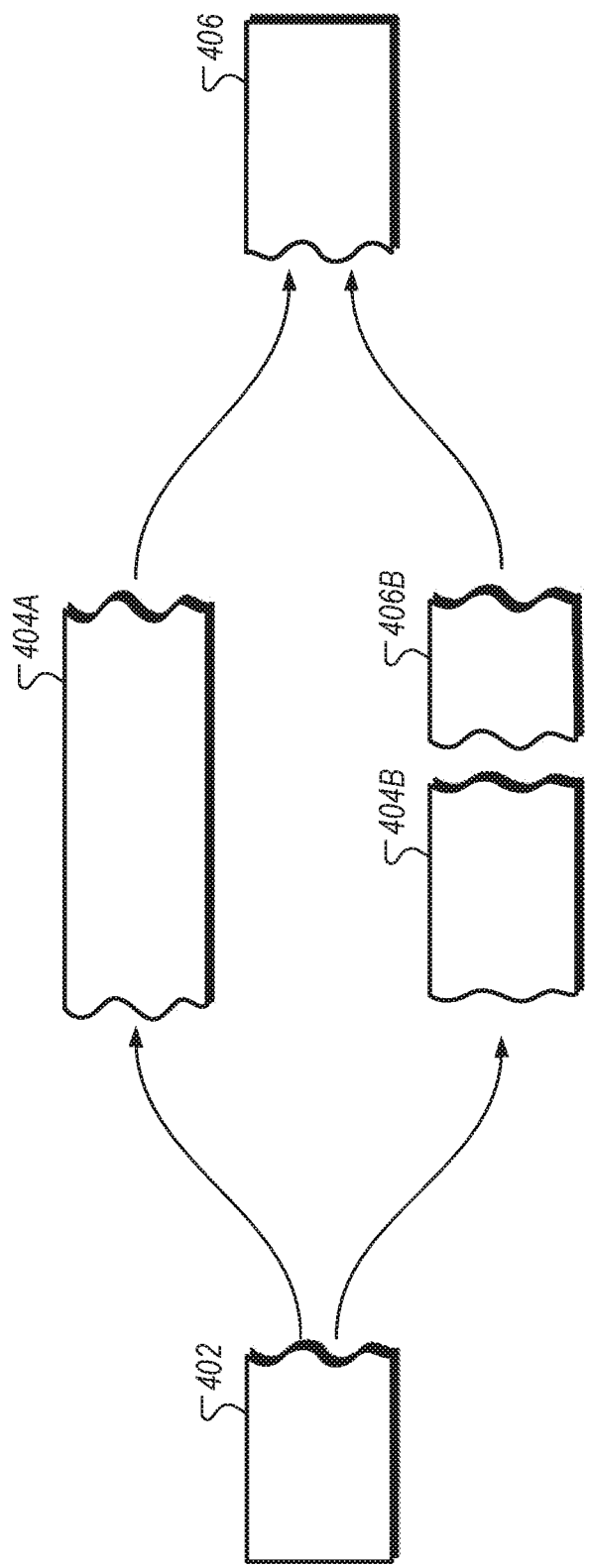
FIG. 4 illustrates an example of a technique for synchronizing customized portions of content streams.

FIG. 4 illustrates an example of a technique for synchronizing intermediate portions of content streams. In the example depicted, a system, e.g., the system 100 generates two customized streams that share an initiating portion 402 and a terminating portion 406 but vary with respect to the intermediate portions. The intermediate portion of the first stream includes a single customized content segment 404A, whereas the intermediate portion of the second stream includes two customized content segments 404B and 406B. In this example, the duration of the customized segment 404A is roughly equal to the combined duration of the customized segments 406A and 406B. For example, in some implementations, the duration of the customized segment 404A and the combined duration of the customized segments 404B and 406B can vary up to 15 seconds from one another.

The customized segments 404A and 404B can represent alternative segments that are customized for different users or different collections of users, e.g., the customized segments B1 and B2 as depicted in FIG. 3 and discussed above. In such instances, the system 100 determines that the duration of the customized segment 404A is longer than the customized segment 404B, which prevents synchronization of providing the content segment 406. To synchronize the duration of the intermediate regions of each content segment, the system 100 inserts the customized segment 404B between the customized segment 404B and the content segment 406. The system 100 selects the customized segment 406B based on, for example, a relevancy to the subject matter depicted within the customized segment 404B and its duration being roughly equal to the duration difference between the customized segments 404A and 404B. In such instances, the customized segment 406B can include filler content such as transition animations. Alternatively, the customized segment 406B can be a content segment having a predetermined duration and is customized for a user or a particular user group in the same manner as the customized segment 404B. For example, the customized segment 406B can represent promotional content that a user is likely to be interested in, secondary content that is associated with the customized content 404B, among others.

In some implementations, the system 100 uses other types of techniques to synchronize two or more customized sequences that are provided to different users and/or different user populations. For example, instead of inserting additional customized segments to a shorter intermediate portion, the system 100 may instead decrease the frame rate of a customized segment to increase its duration to match the duration of a longer parallel customized segment within the intermediate portion of a parallel customized stream. In this example, the system 100 increases the frame rate in a manner such that the adjustment is not perceivable by a user that views the adjusted stream. In another example, the system 100 may insert short time delays at specified portions of a customized stream in a manner that produces an elongated stream but does not significantly impact the user's viewing experience. For instance, the system 100 may insert 1-2 second gaps at 15-minute intervals within an hour-long customized segment.

Figure 5:
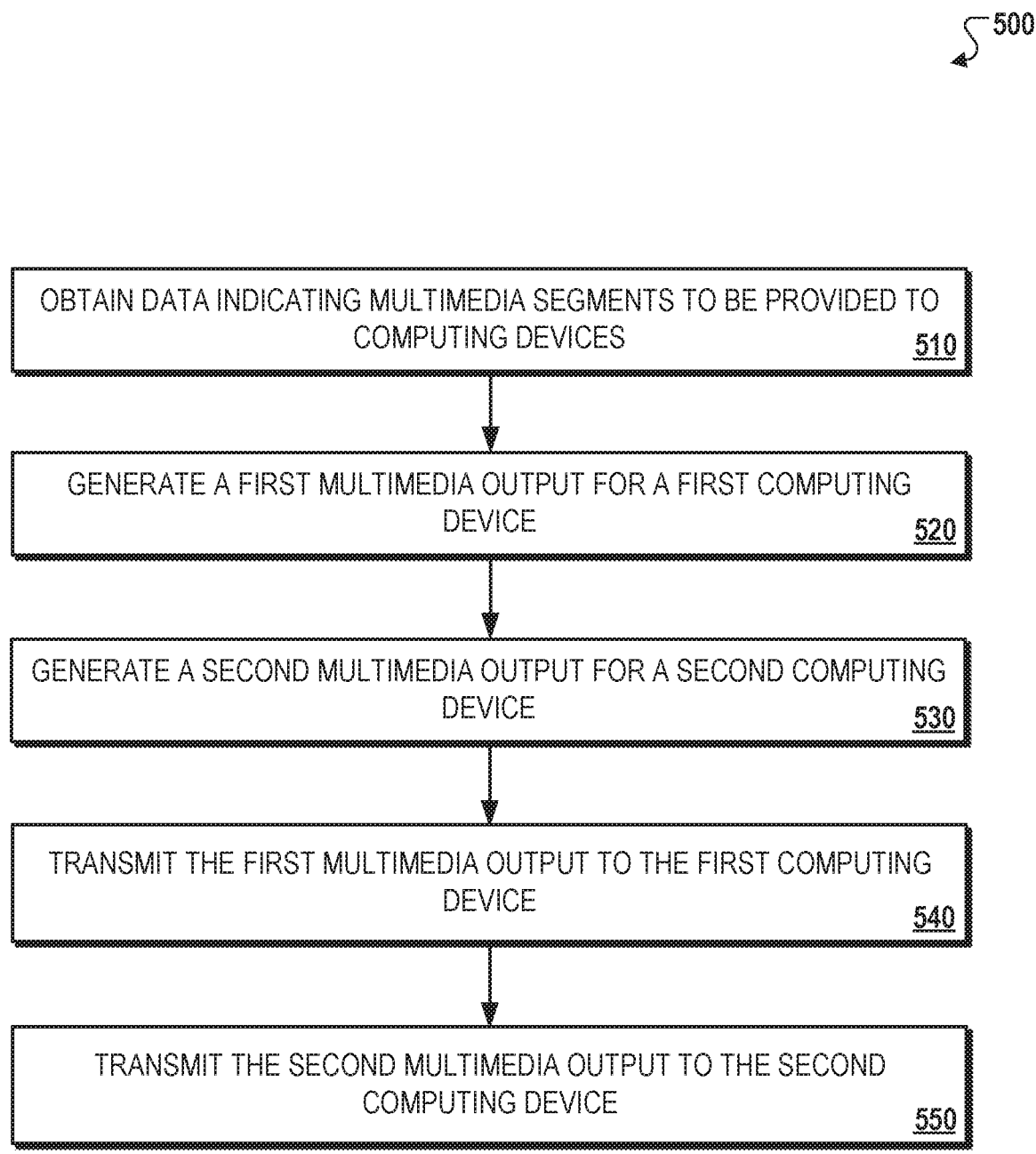
FIG. 5 illustrates an example of a process for generating customized streams that are distributed to different users.

FIG. 5 illustrates an example of a process 500 for generating customized streams that are distributed to different users. Briefly, the process 500 can include the operations of obtaining data indicating multimedia segments to be provided to computing devices (510), generating a first multimedia output for a first computing device (520), generating a second multimedia output for a second computing device (530), transmitting the first multimedia output to the first computing device (540), and transmitting the second multimedia output to the second computing device (550).

In general, the process 500 is described in reference to the system 100, although any system can perform the operations of the process 500. In one example, the system 100 may generate customized streams for a live broadcast, as depicted in FIG. 3. In another example, the system 100 may generate customized streams for web-based content, such as online video or online audio, streamed over a network by multiple users.

In more detail, the process 500 can include the operation of obtaining data indicating multimedia segments to be provided to computing devices (510). For example, the server system 110 can obtain data indicating multimedia segments stored within the repository 122. The multimedia segments can include shared content and customized content. In the example depicted in FIG. 1, shared content represents content to be inserted into initiating and terminating portions 104 and 106, which are each included in and shared between the customized streams 132A-C provided to the computing devices 130A-C. Additionally, the customized content represents content to be inserted into customized portions 104A-C, which vary between each of the customized streams 132A-C. In this regard, the customized streams 132A-C, in the example depicted in FIG. 1, share two portions, e.g., shared portions 104 and 106, and are customized with respect to the intermediate portion, e.g., the portion between shared portions 104 and 106.

The example depicted in FIG. 1 illustrates two portions that are shared between each of the customized streams 132A-C, e.g., the initiating portion 104 and the terminating portion 106. In some implementations, however, the customized streams 132A-C can instead only have shared portion. In one example, the single shared portion is initiating portion 104 such that the portions that follow are each customized with respect to each customized stream 132A-C. As another example, the single shared portion is the terminating portion 106 such that the portions that precede the shared portion are customized with respect to each customized stream 132A-C. As another example, the shared portion can be the intermediate portion such that both the initiating and terminating portions of the customized streams 132A-C are customized with respect to one another.

The process 500 can include the operation of generating a first multimedia output for a first computing device (520). For example, the server system 110 can generate the customized media stream 132A to be provided for output to the computing device 130A. As depicted in FIG. 1, in this example, the server system 110 generates the customized output 132A based on selecting the customized segment 104A from among a collection of customized segments stored within the repository 122, and combines the shared initiating portion 104, the customized segment 104A, and the terminating portion 106 to generate the customized stream 132A. The customized stream 132A is combined according to a specified sequence that specifies that the initiating portion 104 preceding the customized segment 104A, and the customized segment 104A preceding the terminating portion 106.

The process 500 can include the operation of a second multimedia output for a second computing device (530). For example, the server system 110 can generate the customized media stream 132B to be provided for output to the computing device 130B. As depicted in FIG. 1, in this example, the server system 110 generates the customized output 132B based on selecting the customized segment 104B from among a collection of customized segments stored within the repository 122, and combines the shared initiating portion 104, the customized segment 104B, and the terminating portion 106 to generate the customized stream 132B. The customized stream 132B is combined according to a specified sequence that specifies that the initiating portion 104 preceding the customized segment 104A, which then precedes the terminating portion 106.

The process 500 can include the operation of transmitting the first multimedia output to the first computing device (540). For example, as depicted in FIG. 1, the customized stream 132A is provided for output to the computing device 130A.

The process 500 can include the operation of transmitting the second multimedia output to the second computing device (550). For example, as depicted in FIG. 1, the customized stream 132B is provided for output to the computing device 130B.

In some implementations, the customized streams 132A-C represent include one more portions of live broadcasts that is provided over a common programming time segment, e.g., from 8 PM to 10 PM on Saturday evening. In such implementations, the initiating and terminating portions 104 and 106 can represent, for instances, portions of the broadcast that are provided to each of the computing devices 130A-C, whereas the customized segments 104A-C represent different video files and/or broadcast streams that are provided to each of the computing devices 130A-C. FIG. 3 provides another example of a live broadcast in which techniques described herein are applied to live broadcast streams.

Figure 6:
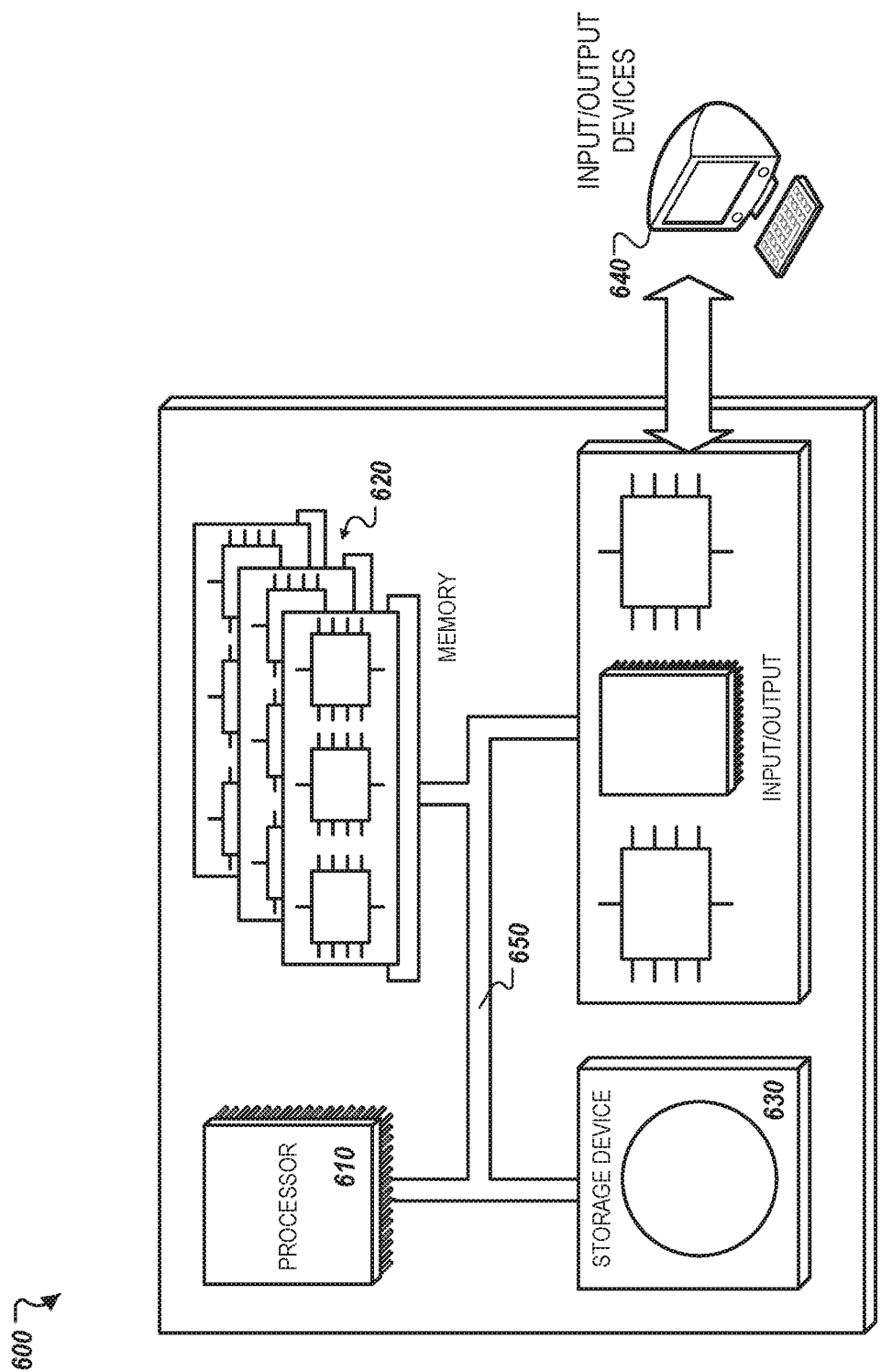
FIG. 6 is a block diagram of computing devices on which the processes described herein, or potions thereof, may be implemented.

FIG. 6 illustrates a schematic diagram of a computer system 600 that can be applied to any of the computer-implemented methods and other techniques described herein. The system 600 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 600) and their structural equivalents, or in combinations of one or more of them. The system 600 is intended to include various forms of digital computers, such as laptops, desktops, workstations, personal digital assistants, servers, blade servers, mainframes, and other appropriate computers, including vehicles installed on base units or pod units of modular vehicles. The system 600 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that can be inserted into a USB port of another computing device.

The system 600 includes a processor 610, a memory 620, a storage device 630, and an input/output device 640. Each of the components 1010, 1020, 1030, and 640 are interconnected using a system bus 650. The processor 610 is capable of processing instructions for execution within the system 600. The processor can be designed using any of a number of architectures. For example, the processor 610 can be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   obtaining account data associated with a user device included within a set of user devices;
   identifying a first multimedia segment and a second multimedia segment associated with an event, wherein the first multimedia segment and the second multimedia segments are configured to be provided to each user device included in the set of user devices;
   selecting, based on the account data, a live multimedia segment from a set of live multimedia segments, wherein:
     each live multimedia segment included the set of live multimedia segments (i) corresponds to an event to be broadcasted to the user device, and (ii) depicts a different field of view of the event,
     the set of live multimedia segment comprises one or more additional live multimedia segments associated with other user devices included in the set of user devices that are not the user device, and
     the live multimedia segment that was selected from the set of live multimedia segments is different from the one or more additional live multimedia segments;
   generating a customized multimedia stream for the user device based at least on the first multimedia segment, the second multimedia segment, and live multimedia segment that was selected from the set of live multimedia segments, wherein the customized multimedia stream is generated by combining the first multimedia segment, the second multimedia segment, and live multimedia segment such that (i) the first multimedia segment precedes the live multimedia segment within the customized multimedia stream and (ii) the live multimedia segment precedes the second multimedia segment within the customized multimedia stream;

synchronizing the customized multimedia stream with one or more other customized multimedia streams generated for other user devices included in the set of user devices; and broadcasting the customized multimedia stream to the user device based on synchronizing the customized multimedia stream with the one or more other customized multimedia streams.

2. The method of claim 1, wherein:

the account data indicates a geographic location of the user device; and the live multimedia segment is selected based on the geographic location.

3. The method of claim 1, wherein:

the account data specifies a set of attributes of a user associated with the user device;

the method further comprises:
  providing the set of attributes as input to a model that is trained to predict a set of user preferences based on a given set of attributes;
  obtaining, from the model, a particular set of user preferences predicted by the model based on the set of attributes being provided as input; and
the live multimedia segment is selected from the set of live multimedia segments based on the particular set of user preferences.

4. The method of claim 1, further comprising:

determining that a duration of the live multimedia segment does not satisfy a threshold duration; and adjusting the live multimedia segment based on determining that the duration of the live multimedia segment does not satisfy the threshold duration.

5. The method of claim 4, wherein adjusting the live multimedia segment comprises combining one or more additional multimedia segments with the live multimedia segment such that an adjusted duration matches the threshold duration.

6. The method of claim 5, wherein the one or more additional multimedia segments comprises an advertisement.

7. A system comprising:

one or more computing devices; and one or more storage devices storing instructions that, when executed by the one or more computing devices, causes the one or more computing devices to perform operations comprising:
  obtaining account data associated with a user device included within a set of user devices;
  identifying a first multimedia segment and a second multimedia segment associated with an event, wherein the first multimedia segment and the second multimedia segments are configured to be provided to each user device included in the set of user devices;
  selecting, based on the account data, a live multimedia segment from a set of live multimedia segments, wherein:
    each live multimedia segment included the set of live multimedia segments (i) corresponds to an event to be broadcasted to the user device, and (ii) depicts a different field of view of the event,
    the set of live multimedia segment comprises one or more additional live multimedia segments associated with other user devices included in the set of user devices that are not the user device, and
    the live multimedia segment that was selected from the set of live multimedia segments is different from the one or more additional live multimedia segments;
  generating a customized multimedia stream for the user device based at least on the first multimedia segment, the second multimedia segment, and live multimedia segment that was selected from the set of live multimedia segments, wherein the customized multimedia stream is generated by combining the first multimedia segment, the second multimedia segment, and live multimedia segment such that (i) the first multimedia segment precedes the live multimedia segment within the customized multimedia stream and (ii) the live multimedia segment precedes the second multimedia segment within the customized multimedia stream;
  synchronizing the customized multimedia stream with one or more other customized multimedia streams generated for other user devices included in the set of user devices; and
  broadcasting the customized multimedia stream to the user device based on synchronizing the customized multimedia stream with the one or more other customized multimedia streams.

8. The system of claim 7, wherein:

the account data indicates a geographic location of the user device; and the live multimedia segment is selected based on the geographic location.

9. The system of claim 7, wherein:

the account data specifies a set of attributes of a user associated with the user device;

the operations further comprises
  providing the set of attributes as input to a model that is trained to predict a set of user preferences based on a given set of attributes;
  obtaining, from the model, a particular set of user preferences predicted by the model based on the set of attributes being provided as input; and
  the live multimedia segment is selected from the set of live multimedia segments based on the particular set of user preferences.

10. The system of claim 7, wherein the operations further comprise:

determining that a duration of the live multimedia segment does not satisfy a threshold duration; and adjusting the live multimedia segment based on determining that the duration of the live multimedia segment does not satisfy the threshold duration.

11. The system of claim 10, wherein adjusting the live multimedia segment comprises combining one or more additional multimedia segments with the live multimedia segment such that an adjusted duration matches the threshold duration.

12. The system of claim 11, wherein the one or more additional multimedia segments comprises an advertisement.

13. At least one non-transitory computer-readable storage device storing instructions that, when executed by one or more processors, causes the one or more processors to perform operations comprising:

obtaining account data associated with a user device included within a set of user devices;

identifying a first multimedia segment and a second multimedia segment associated with an event, wherein the first multimedia segment and the second multimedia segments are configured to be provided to each user device included in the set of user devices;

selecting, based on the account data, a live multimedia segment from a set of live multimedia segments, wherein:

each live multimedia segment included the set of live multimedia segments (i) corresponds to an event to be broadcasted to the user device, and (ii) depicts a different field of view of the event, the set of live multimedia segment comprises one or more additional live multimedia segments associated with other user devices included in the set of user devices that are not the user device, and the live multimedia segment that was selected from the set of live multimedia segments is different from the one or more additional live multimedia segments;

generating a customized multimedia stream for the user device based at least on the first multimedia segment, the second multimedia segment, and live multimedia segment that was selected from the set of live multimedia segments, wherein the customized multimedia stream is generated by combining the first multimedia segment, the second multimedia segment, and live multimedia segment such that (i) the first multimedia segment precedes the live multimedia segment within the customized multimedia stream and (ii) the live multimedia segment precedes the second multimedia segment within the customized multimedia stream;

synchronizing the customized multimedia stream with one or more other customized multimedia streams generated for other user devices included in the set of user devices; and broadcasting the customized multimedia stream to the user device based on synchronizing the customized multimedia stream with the one or more other customized multimedia streams.

14. The non-transitory computer-readable storage device of claim 13, wherein:

the account data indicates a geographic location of the user device; and the live multimedia segment is selected based on the geographic location.

15. The non-transitory computer-readable storage device of claim 14, wherein:

the account data specifies a set of attributes of a user associated with the user device;

the operations further comprise:

providing the set of attributes as input to a model that is trained to predict a set of user preferences based on a given set of attributes;

obtaining, from the model, a particular set of user preferences predicted by the model based on the set of attributes being provided as input; and the live multimedia segment is selected from the set of live multimedia segments based on the particular set of user preferences.

16. The non-transitory computer-readable storage device of claim 13, wherein the operations further comprise:

determining that a duration of the live multimedia segment does not satisfy a threshold duration; and adjusting the live multimedia segment based on determining that the duration of the live multimedia segment does not satisfy the threshold duration.

17. The non-transitory computer-readable storage device of claim 16, wherein adjusting the live multimedia segment comprises combining one or more additional multimedia segments with the live multimedia segment such that an adjusted duration matches the threshold duration.

18. The non-transitory computer-readable storage device of claim 17, wherein the one or more additional multimedia segments comprises an advertisement.

\* \* \* \* \*